Nov. 15, 1938. P. NADELSON Re. 20,920

CONTAINER

Original Filed Aug. 8, 1933 2 Sheets-Sheet 1

WITNESS
G. V. Rasmussen

BY

INVENTOR
PHILIP NADELSON
Wilson Helbeck
ATTORNEYS

Nov. 15, 1938. P. NADELSON Re. 20,920

CONTAINER

Original Filed Aug. 8, 1933 2 Sheets-Sheet 2

WITNESS

G. V. Rasmussen

BY

INVENTOR

PHILIP NADELSON

Nilsen & Schwenk

ATTORNEYS

Reissued Nov. 15, 1938

Re. 20,920

UNITED STATES PATENT OFFICE 20,920

CONTAINER

Philip Nadelson, New York, N. Y.

Original No. 2,092,772, dated September 14, 1937, Serial No. 684,132, August 8, 1933. Renewed December 7, 1936. Application for reissue March 19, 1938, Serial No. 197,020

19 Claims. (Cl. 229—15)

My invention relates to a container for packaging commodities, for instance, coffee, tobacco, and like materials, which would be adversely affected by contact with air. My invention, more particularly, contemplates the provision of a flexible container into which the material may be packed in an atmosphere which is inert with respect to the material to be packed in such a container.

An object of the invention therefore is to provide a container which is effective to retain the odor, flavor and consistency of the packaged material. A further object of the invention is to provide a container which is hermetically sealed so as to be gas-tight and moisture-proof, and retains such characteristics so as to preserve the packed material in the same condition as that in which it was packaged until the contents of such container are ready for removal for consumption.

A further object of the invention is to provide a flexible container in which may be packed any suitable materials in pre-weighed or otherwise accurately measured amounts or units, so that units of the packed material may be removed from the container in such accurately measured amounts for individual use. Thus, my novel container permits the packaging of various materials in individual compartments constituting the container, so as to permit a choice of varied materials or ingredients in preparing a mixture or blending of differently colored or flavored materials.

A further object of my invention is to provide a package in which specific amounts of a particular material have been compressed and compacted as the material was packaged.

A still further object of my invention is to provide a container which is capable of re-use and more particularly a container which, after the contents thereof have been removed for repacking, may be collapsed and returned in such collapsed condition to the original shipper.

Broadly speaking, my invention comprises a flexible container to receive a commodity, the commodity being packed in a tubing of a flexible, stretchable or resilient material, for instance, "Cellophane", the ends of the tubing being closed with strips of a rigid material, such as metal, wood, glass, or composition, the strips being of somewhat larger cross-sectional area than the tubing. The peripheries of the strips forming the end closures of the container are in such close contact with the tubing forming the container wall that a substantially air-tight sealing of the package or container is obtained.

Figure 1:
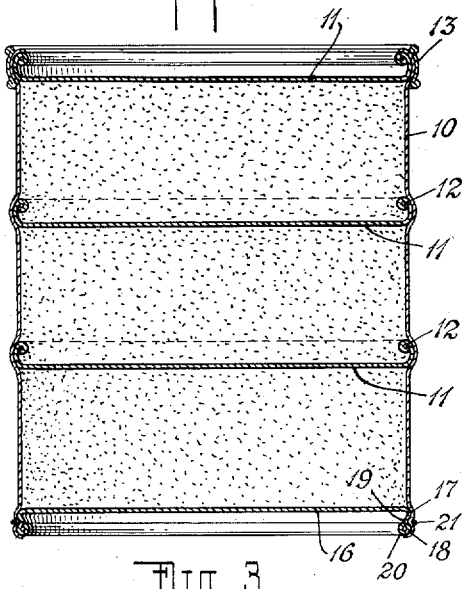
Figure 2:
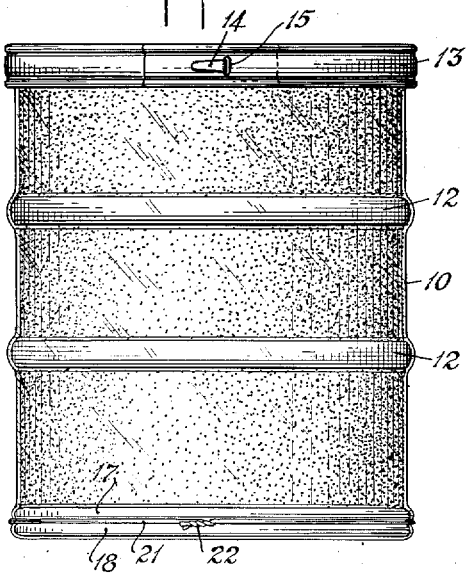
Figure 3:
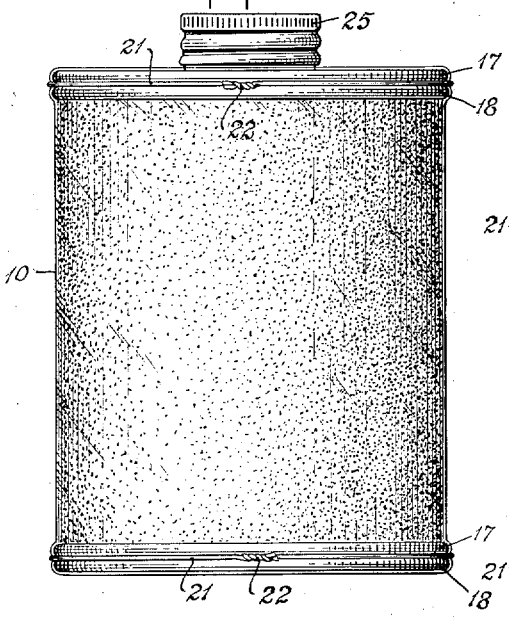
Figure 4:
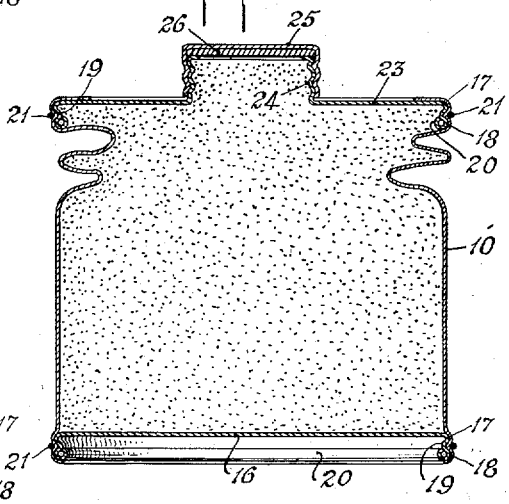
Figure 5:
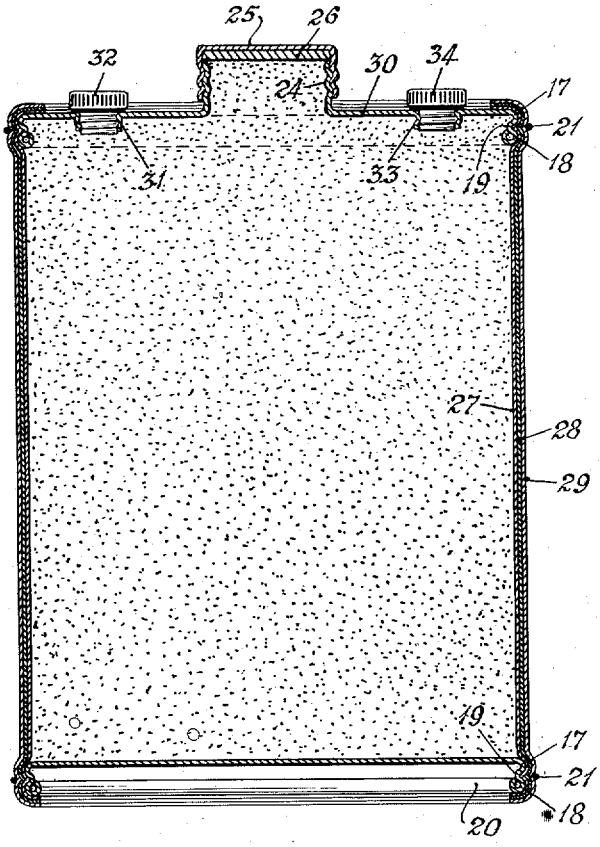
Figure 6:
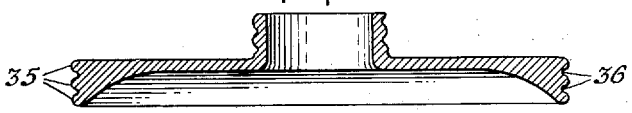
Figure 7:
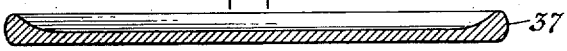
Figure 8:
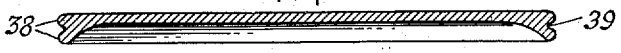

In the accompanying drawings, forming part of this specification, are illustrated three specific forms of my invention. In such drawings, Fig. 1 is a vertical section through the center of a flexible container constructed in accordance with my invention; Fig. 2 is a front view of such container, both such figures showing the container with the material packed therein; Fig. 3 is a front view of a flexible container constructed in accordance with my invention having a single compartment for receiving the material to be packed; Fig. 4 shows the container of Fig. 3 in a partially collapsed condition after some of the material packed therein has been removed; Fig. 5 shows a form of flexible container adapted to be collapsed after removal of the contents thereof, and refilled; Figs. 6, 7 and 8 show various forms of dividing strip members which may be used as component parts of my novel container.

Referring more particularly to the drawings, in which similar reference characters identify similar parts in the several views, 10 is a tubing of a flexible material having a degree of resiliency, for instance, a cellulosic material, such as "Cellophane" or similar material, and 11, 11 are discs of any moldable material, for instance, metal, glass, composition, or condensation product, the peripheral edges of which may be rounded either in the course of manufacture of such discs or thereafter into a form of bead 12, 12. The discs 11 are of somewhat larger external diameter than the internal diameter of the tubing 10.

In accordance with the form of the invention illustrated in Figs. 1 and 2, the container is divided into a plurality of compartments by means of the discs 11, thereby segregating the packed material into units which may be weighed previous to packaging or otherwise divided into accurately measured units. In the course of packaging the commodity into my novel flexible container, the discs 11, 11 are forced into position within the tubing 10, such tubing being stretched over the peripheral edges of the discs 11, i. e., over the surfaces of the beads 12, and a band 13 is thereafter placed over the end or other discs. The band 13 is clamped in position by means of tongue 14, which, after being passed through aperture 15 in the portion of the band overlapping the portion from which the tongue 14 projects, is bent over upon such overlapping portion, as will be obvious from an inspection of Fig. 2.

I have illustrated the lowermost disc, designated by the numeral 16 and forming the lower end closure of the container, as of slightly different peripheral configuration than the discs 11. Such lowermost disc 16 has its peripheral edge formed into a sinuous surface presenting two bead formations, 17, 18 having an annular groove or depression 19 therebetween the edge of the disc being curled inwardly upon itself so as to form bead 20. When the tubing 10 has been passed over the beads 17 and 18, a wire element 21 may be passed over the tubing so as to lie within the groove 19 and more firmly secure the tubing to the disc 20. Any obvious expedient of connecting the ends of the wire element 21, for instance, by twisting the ends of the wire element as at 22, may be employed.

The embodiment of my invention just described provides a flexible container having individual compartments or units of any desired number, the contents of which may be discharged from such units without disturbing the contents of the remaining compartments, so that the remaining portions of the packaged material are preserved in the same condition in which they were packed, i. e., hermetically sealed and therefore not subject to deterioration, for instance, by oxidation. The odor, flavor and consistency of the material in the various compartments are therefore retained until such time as the material is to be removed from the container for consumption or use. Such multiple unit container also makes possible the packaging of material in predetermined accurately measured quantities or may be used an an assembly of a variety of materials or commodities for mixing pre-weighed proportions of particular ingredients to be used in preparing a product, for instance, ice cream or fruit gelatine. A combination of various commodities or a blending of materials, for instance, a plurality of different flavors in one package, or a plurality of different colored ingredients for making up a paint mixture, may thus be obtained.

It is to be noted that the tubing material 10, by reason of the fact that the diameter of the discs 11 is greater than the diameter of such tubing, is pressed against the surface of the beads 12 with such force as to yield a hermetic sealing of the individual compartments of the container.

The tubing 10 may obviously be made either seamed or seamless and may be made of any stretchable material or materials (where a multiple wall is desirable), including rubber. My flexible container will be found to be free from the danger of breakage and tearing, no special care having to be taken to obtain such a close compression of the tubing upon the beads 12 as to obtain a moisture-proof and gas-tight seal, as the difference in diameter of the discs and tubing will automatically bring about the necessary close contact between the disc and wall.

As the packaging of the material into my flexible container is preferably carried out in an atmosphere of an inert gas, for instance, carbon dioxide, no air or similar oxidizing medium is permitted to enter the container with the packaged material, if it is desired to exclude air or such oxidizing medium from within the container.

The discs 11 may be made of any material, including metal, wood, glass, etc., so long as such discs may be provided with the typical edge illustrated, either rounded so as to form the bead 12 or to present the grooved peripheral edge to receive the banding element. The binding strip 13 may be transversely corrugated at intervals so as to permit the escape of any gases that may be generated within the container, in which case the tubing will be found to yield sufficiently from the disc wall, but will prevent ingress of air, by reason of the fact that there is sufficient suction present to pull the flexible tubing back upon the surface of the beaded edge of the discs after escape of such generated gases, whereas, in ordinary containers, lowered temperature would suck air in.

In the embodiment of my invention illustrated in Figs. 3 and 4, I have shown a flexible container comprising a single compartment in which the sides of the container are formed by tubing 10 of the same material and composition as that of the tubing of the embodiment of the multiple type container shown in Figs. 1 and 2. The disc 16 forming the lower closure of the container of this embodiment may be similar to that forming the lowermost disc of the multiple compartment container, the upper end of the single compartment container being formed of a disc 23 of like material but having a screw cap type of opening in the center thereof, the neck portion 24 thereof being integral with the remaining portion of the disc 23. A closure cap 25, having a washer 26, is used to complete the closure structure. Obviously, other types of opening and closure may be employed.

The primary advantage of the container shown in Figs. 3 and 4 lies in the fact that as quantities of the packaged material are removed from the container, the latter is collapsed so as to bring it to a size just sufficient to retain the remaining contents and thereby prevent the deterioration of the remaining material, for instance, by oxidation. I am thus enabled to obtain an automatic sealing of the container and a reduction of the volume thereof to precisely that necessary for retaining its contents with a minimum of contamination with air. Of course, the collapsing of the container should be carried out with the cap 25 loose thereon until the size of the container is just sufficient to retain the remaining material, the cap 25 being tightened when the container has been sufficiently collapsed.

In Fig. 5 of the drawings, I have illustrated a flexible container constructed in accordance with my invention which is adapted for re-use, i. e., re-filling by the wholesaler or shipper after the contents thereof have been removed and repacked by a jobber or retailer into containers of smaller capacity, for instance, such as shown in the two previous embodiments of my invention.

The container of Fig. 5 is intended to take the place of large bags or sacks, barrels, casks, etc., such, for instance, as are used for the shipment of spices to jobbers and retailers, the latter selling the contents of such container either directly therefrom or re-packing the material into smaller containers. The flexible container of this embodiment of my invention, as shown, comprises a tubing wall 27 of a viscose or cellulosic material, surrounded by a tubing of a fabric material 28, and having an outer tubing of a moisture-proof material, for instance, rubber. The structure of the disc forming the bottom end of the container may be similar to that of the disc 16 of the previously described embodiments, while the disc 30, comprising the upper end of the container, may be of the same configuration as the disc 23, having the mouth 24 and screw cap 25. The disc 30, however, is provided with a valve structure comprising a depending nozzle 31 having a threaded cap 32 for closing said valve, at one side of the container, and a valve structure of similar construction comprising depending nozzle 33 having threaded cap 34, at the other side of the container. These valves are employed in the operation of filling the container in the following manner: The caps 32 and 34 are removed and a pipe is inserted into one of the depending nozzles 31 or 33, the pipe extending close to the bottom of the container. A second pipe extending slightly below the top disc of the container is then inserted into the other of said nozzles with a lead tube extending from such pipe to a vessel containing lime water. The first pipe is used for the pumping of an inert gas, such as carbon dioxide, into the bottom of the container, the air from the container being exhausted by being displaced upwardly by the flow of the inert gas into the container. As soon as all the air has been exhausted, carbon dioxide will begin to flow through the lead tube within the shorter pipe into the vessel containing the lime water. When the lime water becomes cloudy, complete displacement of the air from the container has taken place and material may then be packed into the container through the central opening 24. I have not illustrated the pipe structure just described as it forms no part of my present invention. When the packing of the material has been completed, the caps 32 and 34 are screwed in position and the cap 25 screwed in position over the opening 24. The container with the material packed therein is shipped to the jobber or retailer who may then dispense the material from the container or repack the same into smaller individual containers, such as illustrated in Figs. 1–4. When all of the packaged material has thus been dispensed, the container may be collapsed and returned in such collapsed condition to the original shipper for re-use by him in the shipment of a new supply of the commodity.

While I have illustrated this embodiment of my flexible container as having a wall comprised of Cellophane, fabric and rubber, any combination of such materials or a single material may be used for the wall. The sealing of the wall material upon the discs forming the two ends of the container may be accomplished in any manner illustrated in the various embodiments of my invention. Thus, instead of using the wire element 21 as a binding strip, a band, such as 13, of the embodiment of my invention of Figs. 1 and 2, may be employed.

In Figs. 6, 7 and 8, I have illustrated various forms of disc members having peripheries of different configuration. For instance, in Fig. 6, the disc may be formed with a periphery having a plurality of beads 35 forming grooves 36 into which may fit a plurality of binding wires such as 21. In Fig. 7, I have illustrated a disc having a single curved peripheral surface 37 which may be used in place of discs 11 intermediate the two end discs of my novel container. In Fig. 8, I have illustrated an intermediate disc having two beads 38 forming a groove 39 for receiving the binding strip. The binding wire or strips are not essential at all places, a greater difference in the respective diameters of discs and wall resulting in an increased seal at their contact lines.

While I have illustrated the various embodiments of my invention as comprising containers of substantially circular cross-section, it is obvious that my invention is applicable to containers of any cross-section, for instance, oval, semi-oval, or rectangular. Also, while I have described specific embodiments of my invention, it is obvious that various modifications therein, particularly in the construction and configuration of specific elements, may be made without departing from my invention.

I claim:

1. A container comprising a tubing of resilient material and a plurality of strips of rigid material positioned within said tubing transversely thereof and dividing said tubing into a plurality of compartments, the cross-sectional area of said strips being greater than the normal cross-sectional area of said tube at the point of contact of said strips with said tubing, whereby the strips are self-seated by the stretching of the tube material at the points of contact of the strips with said tube material.

2. A container comprising a tubing of resilient material and a plurality of substantially rigid discs positioned within said tubing transversely thereof and dividing said tubing into a plurality of compartments, the diameter of each of said discs being greater than the normal diameter of said tubing at the point of contact of said discs with said tubing, whereby the strips are self-seated by the stretching of the tube material at the points of contact of the strips with said tube material.

3. A package comprising a container built up of a tubing of resilient material and a plurality of rigid dividing strips positioned within said tubing transversely thereof the cross-sectional area of each of said strips being greater than the normal cross-sectional area of said tubing at the point of contact of said strips with said tubing whereby the strips are self-seated by the stretching of the tube material at the points of contact of the strips with said tube material, and the packaged material, the latter being capable of removal from the container in individual units into which the packaged material has been divided by said rigid strips.

4. A package comprising a container built up of a tubing of resilient material and a plurality of rigid dividing discs within said tubing transversely thereof, the diameter of each of said discs being greater than the normal diameter of said tubing at the point of contact of said discs with said tubing whereby the strips are self-seated by the stretching of the tube material at the points of contact of the strips with said tube material, and the packaged material, the latter being capable of removal from the container in individual units into which the packaged material has been divided by said rigid discs.

5. A container comprising a tubing of resilient material and a plurality of strips of rigid material positioned within said tubing transversely thereof and dividing said tubing into a plurality of compartments, the cross-sectional areas of said strips being greater than the normal cross-sectional area of said tube at the point of contact of said strips with said tube, said strips having a rounded periphery for effecting a gas-tight sealing of said tubing about the peripheral edges of said strips.

6. A container comprising a tubing of resilient material and a plurality of substantially rigid discs positioned within said tubing transversely thereof and dividing said tubing into a plurality of compartments, the diameter of each of said discs being greater than the normal diameter of said tubing at the point of contact of said discs with said tubing, said discs having a rounded periphery for effecting a gas-tight sealing of said tubing about the peripheral edges of said discs.

7. A container comprising a tubing of resilient material and a plurality of strips of rigid material positioned within said tubing transversely thereof and dividing said tubing into a plurality of compartments, the cross-sectional areas of said strips being greater than the normal cross-sectional area of said tube at the point of contact of said strips with said tube, the peripheral edges of said strips being formed into a bead.

8. A container comprising a tubing of resilient material, a plurality of strips of rigid material within said tubing and extending transversely thereof, a rigid strip constituting one end of the container and having a rounded periphery, a second rigid strip constituting the other end of the container, the tubing overlying said end strips, and a band surrounding the peripheral edges of said end strips clamping said tubing upon said peripheral edges, said container being collapsible longitudinally.

9. A container comprising a tubing of resilient material, a plurality of discs of rigid material within said tubing and extending transversely thereof, a rigid disc constituting one end of the container and having a rounded periphery, a second rigid disc constituting the other end of the container, the tubing overlying said end discs, and a band surrounding the peripheral edges of said end discs clamping said tubing upon said peripheral edges, said container being collapsible longitudinally.

10. A container as claimed in claim 9 in which the peripheral edges of the rigid strips are formed with a plurality of beads having a groove therebetween adapted to receive the band.

11. A collapsible container comprising a tubing of resilient and flexible material, a strip of rigid material constituting one end closure of said tubing, and a second strip of rigid material constituting the other end closure of said tubing, one of said strips being provided with an opening and cooperating closure element, said strips having a larger cross-sectional area than that of said tubing at the point of contact of said strips with said tubing, said container being collapsible longitudinally.

12. A package comprising a longitudinally collapsible container built up of a tubing of resilient and flexible material and a pair of rigid strips of greater cross-sectional area than that of said tubing at the point of contact of said strips with said tubing and constituting the two end closure members of said container, and the packaged material, one of said rigid strips being provided with an opening and cooperating closure element.

13. A container as claimed in claim 11 including a banding member for each of said strips.

14. A container comprising a tube of resilient and flexible material, a strip of rigid material constituting one end closure of said tube, and a second strip of rigid material constituting the other end closure of said tube, one of said strips being provided with an opening and cooperating closure element, said strips having a larger cross-sectional area than that of said tube at the point of contact of said strips with said tube, said container being collapsible longitudinally, and in which the peripheral edges of the strips are rounded so as to receive the tubing and effect a gas-tight sealing thereof about the edges of said strips.

15. A container comprising a flexible tubing, a strip of rigid material of larger cross-sectional area than that of the tubing at the point of contact of said strip with said tubing and constituting one end closure of said tubing, and a second strip of rigid material of like area having a plurality of openings therein and constituting the other end closure of said tubing, said container being collapsible longitudinally.

16. A container comprising a tubing of flexible, stretchable, and resilient material closed at one end and a strip of rigid material positioned within said tubing transversely thereof, the cross-sectional area of said strip being greater than the normal cross-sectional area of said tube at any desired point of contact of said strip with said tubing, whereby the strip is self-seated, without deformation thereof, by the stretching of the tube material at the point of contact of the strip with said tube material.

17. A container comprising a tubing of flexible, stretchable, and resilient material closed at one end and a substantially rigid disc positioned within said tubing transversely thereof, the diameter of said disc being greater than the normal diameter of said tubing at any desired point of contact of said disc with said tubing, whereby the strip is self-seated, without deformation thereof, by the stretching of the tube material at the point of contact of the strip with said tube material.

18. A container comprising a tubing of flexible, stretchable, and resilient material closed at one end and a strip of rigid material positioned within said tubing transversely thereof, the cross-sectional area of said strip being greater than the normal cross-sectional area of said tube at any desired point of contact of said strip with said tube, said strip having a rounded periphery for effecting a gas-tight sealing of said tubing about the peripheral edges of said strip.

19. A container comprising a tubing of flexible, stretchable, and resilient material closed at one end and a strip of rigid material positioned within said tubing transversely thereof, the cross-sectional area of said strip being greater than the normal cross-sectional area of said tube at any desired point of contact of said strip with said tube, the peripheral edges of said strip being formed into a bead.

PHILIP NADELSON.